United States Patent [19]

Pullan

[11] 4,232,081

[45] Nov. 4, 1980

[54] EDGE PROTECTOR TRIM STRIP

[75] Inventor: Ronald E. Pullan, Leeds, England

[73] Assignee: Schlegel (U.K.) Limited, Leeds, England

[21] Appl. No.: 846,242

[22] Filed: Oct. 27, 1977

Related U.S. Application Data

[63] Continuation of Ser. No. 570,518, Apr. 22, 1975, abandoned, which is a continuation-in-part of Ser. No. 519,107, Oct. 30, 1974, abandoned.

[30] Foreign Application Priority Data

Apr. 24, 1974 [GB] United Kingdom ............... 17886/74

[51] Int. Cl.² .......................... E06B 7/18; E06B 7/22; E04F 19/02; B32B 15/06
[52] U.S. Cl. .................... 428/217; 49/490; 49/495; 49/498; 52/312; 52/716; 428/99; 428/218; 428/358
[58] Field of Search .................. 49/490, 491, 495–498, 49/488; 428/122, 164, 188, 217, 358, 99, 100, 218; 52/716–718, 312, 579

[56] References Cited

U.S. PATENT DOCUMENTS

| | | | |
|---|---|---|---|
| 3,002,783 | 10/1961 | Hofmeister | 49/490 |
| 3,124,851 | 3/1964 | Straight et al. | 49/491 |
| 3,167,825 | 2/1965 | Zoller | 49/490 |
| 3,333,381 | 8/1967 | Stark et al. | 49/490 |
| 3,385,001 | 5/1968 | Bordner | 49/497 |
| 3,527,013 | 9/1970 | Kruschwitz | 428/122 |
| 3,545,157 | 12/1970 | Cziptschirsch et al. | 52/717 |
| 3,638,359 | 2/1972 | Kruschwitz | 52/717 |
| 3,665,646 | 5/1972 | Niemanns | 49/490 |
| 3,685,231 | 8/1972 | Blose | 52/716 |
| 3,706,628 | 12/1972 | Azzola | 49/495 |
| 3,742,649 | 7/1973 | Dochnahl | 49/491 |
| 3,883,993 | 5/1975 | Pullan | 49/490 |

FOREIGN PATENT DOCUMENTS

| | | | |
|---|---|---|---|
| 1457531 | 9/1966 | France | 52/716 |
| 1188633 | 4/1970 | United Kingdom | 49/491 |
| 1242436 | 8/1971 | United Kingdom . | |

*Primary Examiner*—Harold Ansher
*Attorney, Agent, or Firm*—Cumpston & Shaw

[57] ABSTRACT

The invention relates to a one piece edge protector trim strip for application to a flange such as that which is found around door openings in motor vehicles. The strip is extruded in a continuous length by a dual durometer extrusion process around a semi-rigid stiffening carrier of generally U-shaped construction so as to provide a body of rubber or plastics material which is of generally U-shaped cross section and is provided on the inner face of the two arms with a plurality of resiliently deformable gripper fins extending inwardly of the arms towards the base of the U which act to hold the strip on the flange and prevent ingress of moisture, and there is at least one gripper fin on one arm of the U and at least two gripper fins on the other arm of the U, the said at least two gripper fins being of a softer material than, e.g. a different compound from, said at least one gripper fin.

30 Claims, 3 Drawing Figures

EDGE PROTECTOR TRIM STRIP

This is a continuation of application Ser. No. 570,518, filed Apr. 22, 1975, now abandoned, which is a continuation-in-part of application Ser. No. 519,107, filed Oct. 30, 1974, now abandoned.

This invention relates to an edge protector trim strip for application to a flange, e.g. of metal or fibreglass, such as is found in motor cars around door apertures, boot apertures and the like.

The strip is designed completely to overlie the flange, which may be comprised of one thickness or two or more thicknesses of metal welded together, so as to protect the flange from the elements and also so as to give the flange a pleasing appearance and to cover over the sharp edges of the flange so as to prevent possible injury to persons using the vehicle, or for that matter, damage to their clothing. In many cases, a rubber seal is attached to the strip to provide a weatherseal and in this case the edge protection provides the means for attaching the rubber seal to the flange.

Edge protector trim strips somewhat similar to that of the present invention are well known and are normally manufactured in indefinite lengths and have a generally U-shaped cross-section, are resiliently deformable and capable of bending and are normally manufactured of rubbery or plastics material strengthened in some way by a metallic or equivalent carrier located inside the rubbery or plastics material. The strips are held in place on the flange by means of grippers or fins extending inwardly from the arms of the U towards the base of the U, the gripper being deformable and made of rubbery or plastics material.

Such known strips, however, tend to be fairly bulky, due partly to the shape of their gripper fins, and do not always provide a really satisfactory seal with the metal flange. They are also difficult to apply to the flange, and because quite a large force is necessary to apply them, the carrier often becomes deformed, thereby reducing their efficiency, i.e. where they are deformed, their retention and their sealing properties are seriously impaired.

In the case of trim strips which have a deformable sealing member (normally of rubber) connected to them, to provide a combined trim strip and door seal, the rubber has, in the past, been extended so as to extend or be deformable into the interior of the trim strip. This is because the fins on prior art strips invariably do not form a good seal with the flange, and allow pasasage of water into the interior of the strip. This is normally due to distortion in fitting. The presence of the rubber, however, largely overcomes the problem. Unfortunately, however, the rubber extending into the interior of the strip means that they are even more difficult to apply to the flange, due to the frictional forces caused by the rubber. This has obvious disadvantages. For example, any distortion caused in fitting the strip will make the rubber seal less efficient. Also, because the rubber is provided within the interior of the strip, its bulkiness is increased and bulky strips occupy a considerable space.

When the sealing member is compressed by a vehicle's door being shut up against the sealing member, it is important to ensure that the maximum space is available for deflection of the seal. Current known strips occupy a considerable space, which will mean that an unacceptable force may be necessary sufficiently to deform the sealing member to allow the door to be shut, particularly when there are variations in the door aperture, which is normal under common manufacturing conditions. A rubber leg within the strip takes up extra space, which further reduces the space for the rubber seal to deflect. Because of these disadvantages, we ensure that the gripper fins themselves perform the sealing function after fitting.

When our new strip is used with a rubber seal, we do not extend the rubber into the interior of the seal, which means that the gripper fins must not only be capable of gripping the flange satisfactorily, but they must also form a really good weatherproof seal with the flange after fitting.

The present invention seeks to provide an edge protector trim strip which overcomes the disadvantages of prior art strips and is much easier to fit than prior art strips, and yet grips the flange satisfactorily over its full length, forming a better seal with the flange. This is because the arms of the U, for any thickness of flange, will not distort beyond the point where their sealing and gripping properties become ineffective.

The invention also seeks to provide such a strip in combination with a sealing member.

According to the present invention, we provide a one piece edge protector trim strip for application to a metal flange or the like such as that found around door openings on motor vehicles, said strip being of indefinite length and having a body of generally U-shaped cross-section, formed of polymeric material such as rubber or plastics, stiffened by a semi-rigid carrier, the strip having throughout its length a plurality of resiliently deformable gripper fins extending from the arms of the U inwardly thereof towards the base of the U, there being at least one gripper fin on one of the arms of the U and at least two gripper fins of softer material than, e.g. a different compound from, said at least one gripper fin, on the other arm of the U.

In one preferred embodiment, there are three gripper fins on the other arm of the U and preferably these three gripper fins are shorter and narrower than said at least one gripper fin, and are of the same cross-section.

The said at least one gripper fin may be made of a plastics or rubbery material similar to that from which the body is formed and in a particular construction the said two gripper fins may be made of different durometer plastics or rubbery material which is extruded with the other plastics or rubbery material in a single extrusion operation.

Preferably, the closed end of the U of the body is flatter, i.e. less round, than in many known constructions, thereby enabling the strip to have one arm of the U lying close to the flange. With our design this will always be the arm to which the rubber seal will be attached.

The present invention is now described by way of example with reference to the accompanying drawings, in which.

Figure 1:
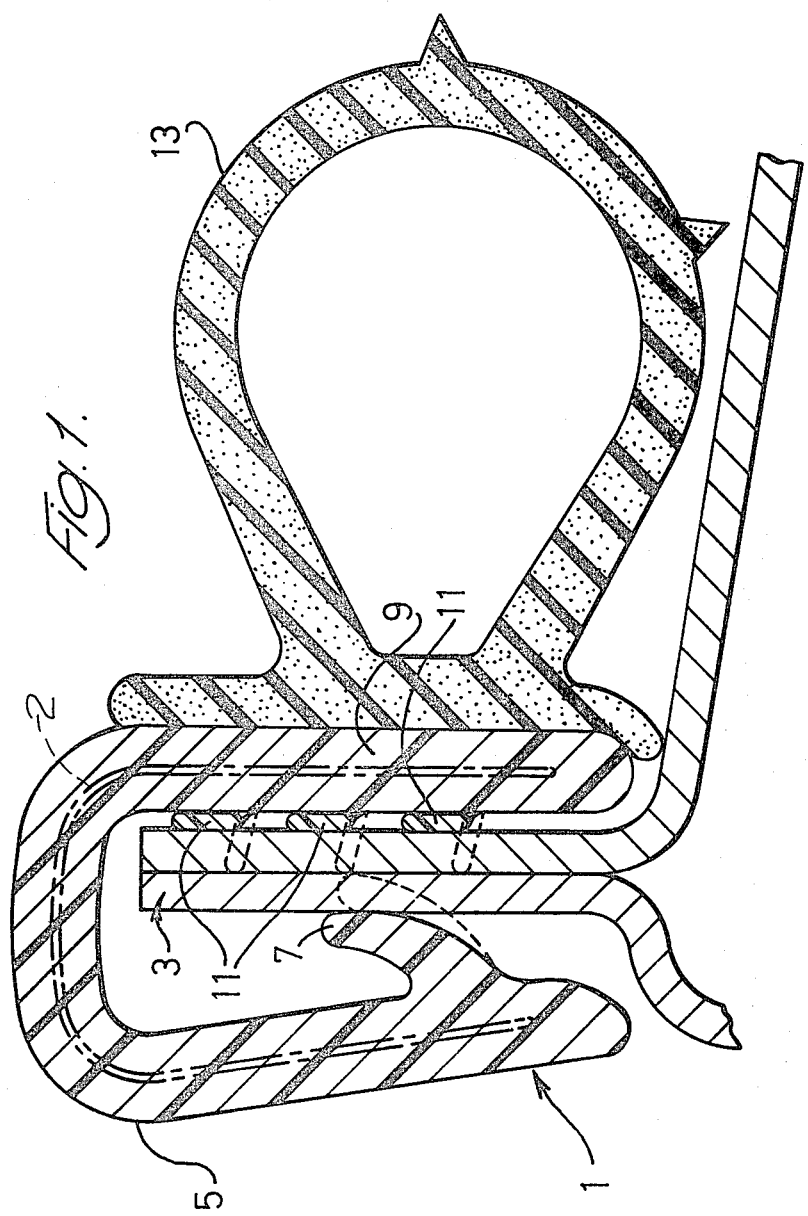
FIG. 1 is an enlarged sectional view showing one embodiment of the edge protector trim strip in accordance with the invention applied to a metal flange.
Figure 2:
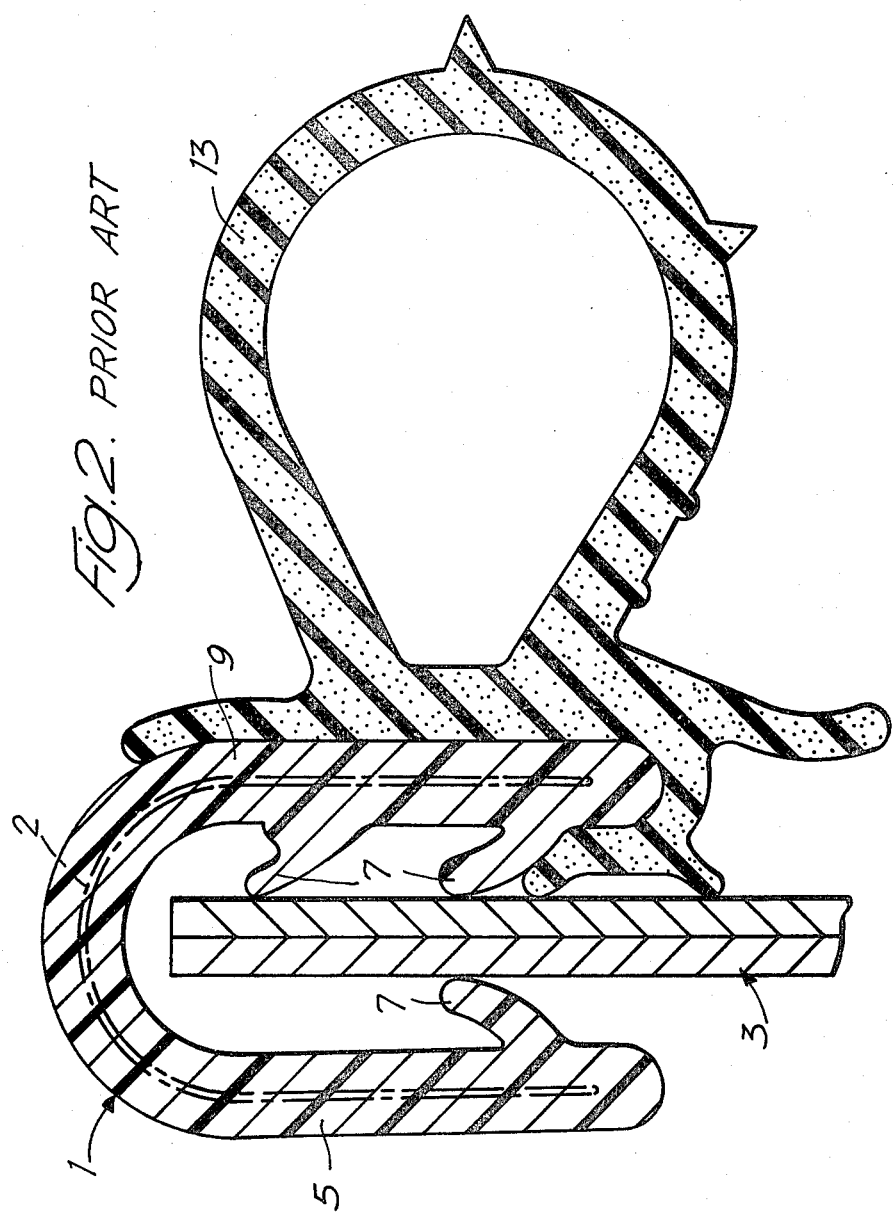
FIG. 2 shows a prior art trim strip applied to a similar flange.

Referring to FIGS. 1 and 2 of the drawings, the edge protector trim strips are shown applied to a metal flange 3 formed of two thicknesses of metal welded together.

The trim strip of FIG. 1 may be dual extruded in known manner, the U-shaped body 1 of the strip, which is formed of a plastics material, being extruded over a semi-rigid carrier 2 (shown centrally of the body in outline) of known construction such as the U-shaped knitted wire carrier traditionally used in edge protector trim strips.

In accordance with the present invention, an arm 5 of the body 1 has throughout its length an inwardly directed first gripper fin 7 which is preferably formed of the same plastics material as the body 1. The other arm 9 of the body is provided with at least two (three as shown are preferred) inwardly directed gripper fins 11 which are made of a softer material than said first gripper fin 7. Furthermore, the gripper fins 11 are generally shorter and slimmer than the gripper fin 7. In FIG. 1 of the drawings the full lines show the position of the gripper fins 7 and 11 in use, whereas the broken lines indicate the position of the gripper fins prior to application of the strip to the metal flange 3.

By using an edge protector trim strip in accordance with the present invention (i.e. as shown in FIG. 1) to cover metal flanges around openings on motor vehicles, the amount of room taken up by the arm 9 having the soft fins 11 is somewhat less than that taken up by traditional strips because, as can be seen from the drawing, the arm 9 is located very close and parallel to the flange 3, whereas in traditional strips, the equivalent arm is spaced further from the flange 3, and inclined to it, as can be seen from FIG. 2. In known strips, there are three possible reasons for the arm 9 to be some distance from the flange 3, namely: (a) the fins on the arm may be of the same material as the U-shaped body of the strip, and hence resist deformation; (b) there may be a portion of a rubber sealing member within the U-shaped body between the arm 9 and the flange; (c) the strip may have a round top (or base of the U), which means that the flange will automatically locate itself centrally of the U-shaped body as the strip is applied to the flange. All three reasons are present in the prior art strip, which is illustrated in FIG. 2, and is currently fitted to a number of motor cars manufactured in Europe.

As can be seen from FIG. 1, the strip may have a sealing member 13 attached to or integral with the arm 9 to provide a combined edge protector, trim and sealing strip, which can form a seal with the periphery of a door of the vehicle when the latter is closed. Alternatively, the sealing member 13 may be in the form of a separate member applied to the periphery of the door. In either case, because the arm 9 lies flat against the flange 3, there is more space available for the deformable, e.g. rubber, sealing member 13. This means that the door is easier to shut, and also allows the vehicle manufacturer greater tolerance in the width of the aperture between the periphery of the door and the flange 3 around the door opening. In other words, door shut pressures can be kept to acceptable levels.

Furthermore, it has been found that the strip of the present invention provides a good water barrier around the flange 3. Two thickness flanges on motor vehicles are unfortunately never perfect because of spot welds and/or metal sheet overlaps giving a step, which provide gaps through which water can pass under the trim strip unless a good seal is provided. The gripper fins on currently available strips which are made of the same material as the body of the strip, i.e. a relatively hard rubbery or plastics material, tend to bridge the indentations caused by the spot welds or the above step between the sheets and allow water to pass and may in fact not even touch the flange if distortion has taken place during fitting. The smaller, soft, gripper fins 11 on the strip of the present invention are more resilient and deform easier and tend to press into the indentations of the spot welds or into the angle of the step, thus giving a good seal. When three gripper fins 11 are used, it is almost inevitable that at some point from the tip to the base of the flange 3, at any location throughout the length of the flange, a good seal will be made, as deformation will be kept to an absolute minimum. Furthermore, by having the three soft gripper fins 11, the outer arm 9 of the strip is caused to lie substantially parallel to the flange.

Figure 3:
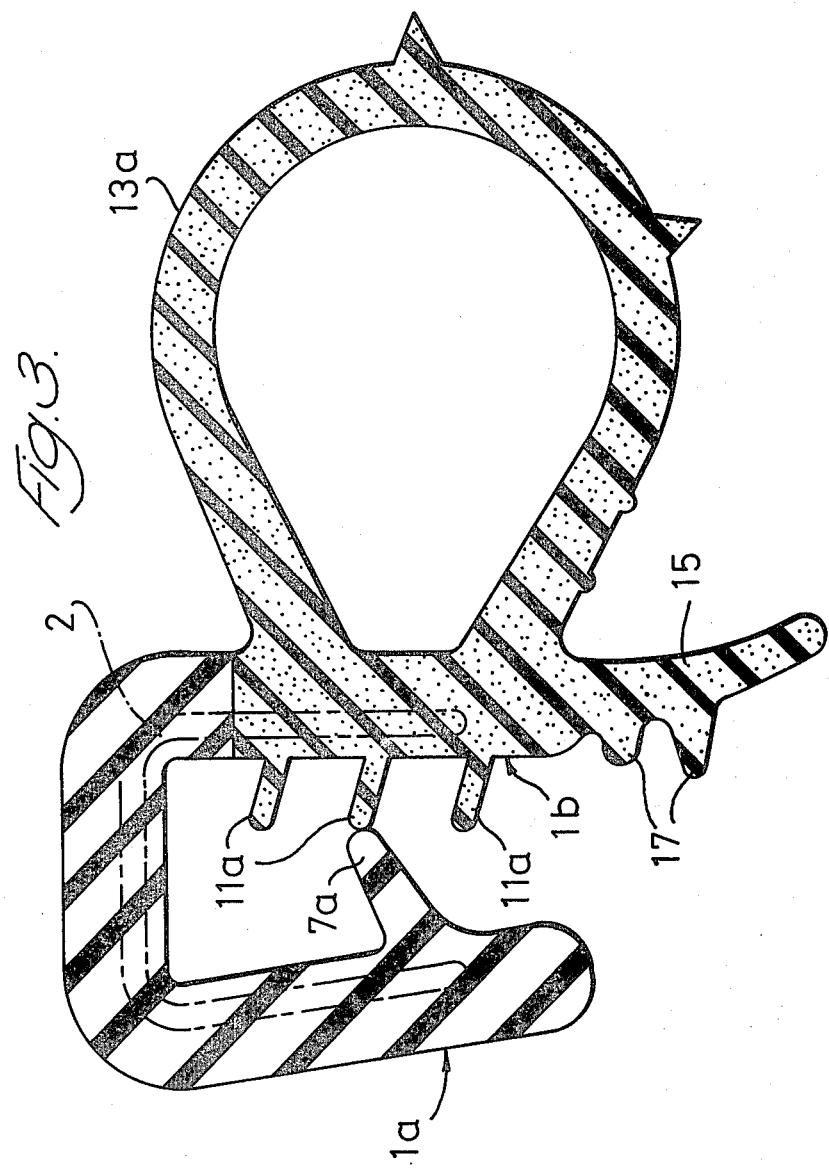
FIG. 3 is an enlarged sectional view of another embodiment of edge protector trim strip in accordance with the invention.

In the embodiment of the invention illustrated in FIG. 1, the body 1 is shown as made of plastics material, the fins 11 being formed of a softer plastics material extruded with the body 1, whereas the sealing member 13 is made of rubber and attached, for example, by means of an adhesive to the body 1. An alternative embodiment of the invention is illustrated in FIG. 3 in which a combined edge protector trim strip and sealing strip is extruded in a single extrusion operation and is made entirely of rubber. A major portion 1a of the body is formed of solid rubber material whereas a minor portion 1b of the body forming the majority of one of the arms of the body is formed of a sponge rubber material and has integral therewith a sealing member 13a, the whole strip being formed by a dual extrusion process around a wire carrier 2. As in the previous construction, a single fin 7a on the arm of the strip made of solid rubber is of solid rubber, whereas the three fins 11a projecting from the body portion 1b made of sponge rubber are also formed of sponge rubber, i.e. a softer material than the material of the fin 7a. To provide a yet further seal, an integral tail 15 extends from the free edge of the body portion 1b and is provided with further inwardly directed gripper fins 17. This tail 15 is provided on known strips however, and is not essential. If omitted, the arm of the U from which it extends would be similar in shape and length to the arm having the fin 7a. When the tail 15 is provided, the fins 17 merely act as an additional safeguard for sealing purposes.

We have also found that it is very important that edge protector trim strips are easy to fit to their flanges. If they require considerable force to fit them to the flange as do prior art strips, then they tend to open out which creates a major deterioration in the sealing qualities of the strip, and also tends to increase its bulkiness. By providing the three soft, slim gripper fins, which collapse easily, we have found that the strip is easy to fit to a flange, which adds to efficiency on any assembly line, and the strip still maintains a good grip on the flange. In fact, we have found by thorough testing, both in the laboratory and on motor cars themselves, that our new strip performs so satisfactorily that, for any given flange width, the strip, when it is applied to the flange, needs less force applied to it and deforms considerably less from its predetermined shape before application than any known prior art strip. Furthermore, for any given flange width, we can provide a strip which, before application to the flange, is narrower than prior art strips, and yet, when fitted, performs better than prior art strips.

In both embodiments of the invention, we have found that a satisfactory seal with the flange to which the strip is to be applied is achieved largely because of the presence of the gripper fin 7 or 7a. This gripper fin is considerably more rigid than the three gripper fins 11 or 11a and as a result ensures that the gripper fins 11 or 11a, which are at once exposed to the weather, are deformed as shown in FIG. 1 and in their deformed state are held tight against the flange 3. This of course also means that the arm of the body from which they project is also held very close to the flange.

Also, because the carrier is not deformed, the tendency for wind and rain to penetrate beyond the strip is minimised. Obviously, moisture penetration is undesirable, and wind penetration causes wind noise, which again is unsatisfactory.

We have also found that with our dual extrusion technique, we can formulate special compounds and design the strip to obtain the best advantages for fitting, gripping, sealing and resiliency and also for resistance to high and low temperatures.

The main body 1 of the strip can be formed from a plain PVC such as that which has customarily been used for such strips for many years. This material has a coefficient of friction when applied against a painted metal flange as found on motor vehicles of 1.0 (for its glossy surface) and of about 0.8 (for its dull surface). The softer fins 11, however, must be of a considerably softer material. Ordinarily available soft PVC lacks resiliency and cannot withstand high temperatures without taking a permanent set and is not therefore wholly satisfactory for the softer fins 11. We have found that a very suitable material for the softer fins 11 is a vinyl nitrile, such as the product of British Industrial Plastics known as Grade VN 516 Vinyl Nitrile. This has a coefficient of friction of about 1.2. Similar compounds are made of I.C.I. These can easily be extruded with the harder plain PVC.

We have carried out tests on a typical strip made in accordance with the present invention when applied to typical flanges and the measurements obtained are set out below. It will be appreciated however that these measurements are only of an explanatory nature and relate to only one random strip. Obviously, strips having different measurements and functioning slightly differently can be manufactured to suit different customers and remain within the scope of this invention.

For a plastics strip having a body 1 and a fin 7 of plain PVC and with small softer fins 11 of vinyl nitrile, the following observation were made when the strip was applied to the painted metal flanges of 2 mm thickness and 3 mm flanges:

Properties of the strip:

| Mouth width: | 4.25mm |
| --- | --- |
| Length of PVC fin 7: | 4.00mm |
| Width of PVC fin 7: | 1.40mm at root tapering to 0.70mm at tip |
| Length of vinyl nitrile fins 11: | 2.00mm |
| Width of vinyl nitrile fins 11: | 0.50mm |
| Angle x between fin 7 and arm of strip from which it extends: | about 48° |
| Angle y between fins 11 and arm from which they extend: | about 60° |

After the above strip had been applied to a flange of 2 mm width, the angle x was reduced to 32° and the angles y were reduced to 5°. This meant that the fin 7 deflected by about 33.3,% whereas the small fins 11 deflected by about 91.6%.

After the above strip had been applied to a flange of 3 mm width, the angle x became 18° and the angle y became about 2°. This meant that the deflection of the fin 7 was about 62.5,% whereas the deflection of the small fins 11 was about 96.6%.

From the foregoing, it can be seen that the presence of the fin 7 will under all circumstances cause the fins 11 to deflect very considerably, and when the strip is applied to wide flanges, the fin 7 will deflect considerably so that the strip can accommodate the flange without the mouth dimension increasing. This explains why strips made in accordance with the present invention have the various advantageous properties mentioned herein.

It must of course be appreciated that the figures given above are only exemplary and that the design of the strips can be changed to suit various requirements; for example, the length, width and material of the flange to which the strip is to be applied.

If the strip is of all rubber construction, there are no heat problems and the soft and hard rubber compounds can be any of the well known compounds at present used in edge and sealing strips, i.e. the softer material can be a plain soft rubber material or a sponge rubber material.

What is claimed is:

1. A one-piece edge protector trim strip for application to an applied position on a flange such as that found around door openings on motor vehicles, said strip having a body of polymeric material of generally U-shaped cross section having a pair of opposed first and second arms having inner opposed first and second surfaces respectively, wherein the improvement comprises:
   (a) a first gripper fin of a first deformable polymeric material on said inner first surface of said first arm of said U-shaped body, said first gripper fin extending generally along the length of said strip and projecting toward said inner second surface; and
   (b) a plurality of second gripper fins of a second deformable polymeric material softer than said first deformable polymeric material on said inner second surface of said second arm of said U-shaped body, said second gripper fins extending generally along the length of said strip and projecting toward said inner first surface;
   whereby when said edge protector trim strip is applied on a flange, said first gripper fin engages and deforms a certain amount against one surface of said flange causing said opposite surface of said flange to engage and deform said second gripper fins a greater amount whereby said more greatly deformed second gripper fins (1) serve to accommodate flanges of different thicknesses, (2) form a good water seal between said opposite surface of said flange and said second gripper fins, and (3) present increased anti-sliding friction surfaces in engagement with said opposite surface of said flange for resisting removal of said film strip from said flange.

2. An edge protector trim strip as claimed in claim 1 wherein said plurality of gripper fins are shorter and narrower than said first gripper fin.

3. An edge protector trim strip as claimed in claim 1 wherein said plurality of gripper fins are of the same cross-section.

4. An edge protector trim strip as claimed in claim 1 wherein said first gripper fin is made of the same polymeric material as that from which said U-shaped body is formed.

5. An edge protector trim strip as claimed in claim 1 wherein the closed end of said U-shaped body is substantially flat as distinct from semi-circular.

6. An edge protector trim strip as claimed in claim 1 including a sealing strip secured to an outer surface of said second arm.

7. An edge protector trim strip as claimed in claim 1 wherein a major portion of said body of the strip is formed of solid polymeric material, and a minor portion thereof including said plurality of said second fins and the portion of said second arm from which said plurality of second gripper fins project is formed of a softer polymeric material.

8. An edge protector trim strip as claimed in claim 1 wherein said plurality of second gripper fins comprises three gripper fins shorter and narrower than said first gripper fin, and wherein a major portion of said U-shaped body of said strip is formed of a solid polymeric material, and a minor portion thereof including said three gripper fins and said second arm from which said three gripper fins project is formed of said softer polymeric material.

9. An edge protector strip as claimed in claim 1 wherein said plurality of second gripper fins comprise three gripper fins of the same cross section, and wherein a major portion of said U-shaped body of said strip is formed of a solid polymeric material, and a minor portion thereof including said three gripper fins and said second arm from which said three gripper fins project is formed of said softer polymeric material.

10. The edge protector trim strip of claim 1 wherein said body of polymeric material has a semi-rigid stiffening carrier located within said body.

11. A one-piece edge protector trim strip for application to an applied position on a flange such as that found around door openings on motor vehicles, said strip having a body of generally U-shaped cross section wherein a major portion of said body is formed of a solid polymeric material and a minor portion thereof is formed of a softer polymeric material, said U-shaped body having a pair of opposed first and second arms having inner opposed first and second surfaces respectively, wherein the improvement comprises:
  (a) a first gripper fin of the same polymeric material as said major portion of said U-shaped body, said major portion includes said first arm from which said first gripper fin projects, said first gripper fin further projects from said inner first surface of said first arm toward said inner second surface and extends along the length of said strip; and
  (b) a plurality of second gripper fins of the same polymeric material as said minor portin of said U-shaped body, said minor portion includes said second arm from which said plurality of second gripper fins project, said second gripper fins further project from said inner second surface of said second arm toward said inner first surface along the length of said strip;
  whereby when said edge protector trim strip is applied on a flange said first gripper fin engages and deforms a certain amount against one surface of said flange causing said opposite surface of said flange to engage and deform said second gripper fins a greater amount to form a good water seal between said opposite surface of said flange and said second gripper fins.

12. An edge protector trim strip as claimed in claim 11 including an additional sealing element extending from the free end of said second arm.

13. A one-piece edge protector trim strip for application to an applied position on a flange such as that found on door openings on motor vehicles, said strip having a body of PVC material of generally U-shaped cross-section, said body having a pair of opposed first and second arms having inner opposed first and second surfaces respectively, wherein the improvement comprises:
  (a) a first gripper fin on said inner first surface of said first arm of said U-shaped body and extending along the length of said strip and projecting toward said inner second surface, said first gripper fin further being made of the same PVC material as said U-shaped body; and
  (b) a plurality of second gripper fins on said inner second surface of said second arm of said U-shaped body and extending along the length of said strip and projecting towards said inner first surface, said second fins further being formed of a vinyl nitrile material which is softer than said PVC material;
  wherein when said edge protector trim strip is applied on a flange, said first gripper fin engages and deforms a certain amount against one surface of said flange causing said opposite surface of said flange to engage and deform said second gripper fins a greater amount to form a good water seal between said opposite surface of said flange and said second gripper fins.

14. An edge protector trim strip as claimed in claim 13 wherein said harder PVC has a coefficient of friction of between about 0.8 and 1.0, and wherein the coefficient of friction of vinyl nitrile is about 1.2.

15. An edge protector trim strip as claimed in claim 13 wherein said first fin has a length of about 4.00 mm and a width varying from 0.70 mm at the tip to about 1.40 mm at the root and wherein said plurality of second fins are about 2.00 mm long and 0.50 mm thick and wherein the width of the mouth of the U-shaped body is about 4.25 mm, said plurality of second fins subtending an angle of about 60° with said second arm of the strip and said first fin subtending an angle of about 48° from said first arm.

16. An edge protector trim strip as claimed in claim 15 wherein when the strip is applied to a flange of 2.00 mm width, the angle 48° is reduced to about 32°, and the angle 60° is reduced to about 5°.

17. An edge protector trim strip as claimed in claim 15 wherein when the strip is applied to a flange of 3.00 mm width, the angle 48° is reduced to about 18°, and the angle 60° is reduced to about 2°.

18. A one-piece edge protector trim strip for application to an applied position on a flange such as that found around door openings on motor vehicles, said strip having a body of polymeric material of generally U-shaped cross section having a pair of opposed first and second arms having inner opposed first and second surfaces respectively, wherein the improvement comprises:
  (a) a first gripper fin of first deformable polymeric material on said inner first surface of said first arm of said U-shaped body, said first gripper fin extending generally along the length of said strip and projecting toward said inner second surface; and (b) a plurality of second gripper fins on said inner second surface of said second arm of said U-shaped body, said second gripper fins being formed of a second deformable polymeric material softer than said first deformable polymeric material, and further extending generally along the length of said strip and projecting toward said inner first surface.

19. The edge trim strip of claim 18 wherein said body of polymeric material has a semi-rigid stiffening carrier located within said body.

20. A channel-shaped sealing strip, comprising a channel-shaped metal carrier member, and flexible material in channel shape and extruded directly onto the outside surface of, and at least part of the inside surface of, the carrier,
the flexible material on the inside surface of the carrier being extruded to define gripping ribs which are integral with the flexible material on the inside surface of the carrier and which extend respectively along the two inside facing walls of the channel and project towards each other for assisting in retaining the sealing strip on a mounting flange,
the said ribs on the respective walls of the channel being of different hardnesses.

21. A strip according to claim 20, including a beading extending longitudinally of the strip and extruded integrally with the flexible material on the outside of one wall of the carrier member.

22. A channel-shaped sealing strip, comprising a channel-shaped carrier member made of relatively rigid material but designed so as to be flexible about the length of the channel,
a covering of flexible material over the outside surface of the carrier member and extending over the distal edges of the side walls of the carrier member and over at least part of the inside surfaces thereof,
the said flexible material defining gripping ribs extending longitudinally along the inside surface of the channel and projecting toward each other from the opposite side walls thereof,
at least part of the said material on one side wall of the carrier member being of relatively hard flexible material which is placed directly onto the carrier member,
at least part of the flexible material on the other side wall of the carrier member being of relatively softer flexible material which is placed directly onto the carrier member,
the relatively hard and relatively softer materials not overlapping each other, and
a beading running along the outside of the channel and defined by the relatively softer flexible material.

23. A strip according to claim 22, in which the relatively hard and the relatively softer flexible materials are each extruded onto the carrier member.

24. A strip according to claim 22, in which the or each gripping rib on one side of the strip is defined by the relatively hard flexible material and the or each gripping rib on the other side of the channel is defined by the relatively softer flexible material.

25. A strip according to claim 22, in which the relatively hard flexible material covers the major portion of the outside surface of the carrier member, and
the relatively softer material covers the inside surface of the carrier member and the remaining portion of the outside surface thereof.

26. A strip according to claim 22, in which the relatively hard and relatively softer flexible materials are plastics material and rubber material, respectively.

27. A strip according to claim 22, in which the said relatively hard flexible material completely covers the distal edge and both surfaces of the said one side wall of the carrier member, and
the said relatively softer flexible material covers the distal edge of the said other side wall of the carrier member and extends over both surfaces thereof from that edge,
the remainder of the carrier member being covered by the relatively hard flexible material.

28. A strip according to claim 27, in which the or each gripping rib on one side of the strip is defined by the relatively hard flexible material and the or each gripping rib on the other side of the channel is defined by the relatively softer flexible material.

29. A method of making a channel-shaped sealing strip comprising the steps of
extruding flexible covering material in relatively hard and relatively soft forms directly onto different regions of a longitudinally extending carrier member so as together they completely cover one surface thereof and join along a line extending longitudinally of that surface, the lateral edges of the carrier member and at least the marginal regions of the other surface of the carrier member being also directly covered by the extruded flexible covering material, at least part of this material being in the relatively soft form,
the material in the relatively soft form on the said one surface additionally being extruded to provide a beading extending longitudinally of the carrier member parallel to the said line,
the material on the said other surface additionally being extruded to provide ribs extending longitudinally of the carrier member parallel to the said line,
the said regions being such that, with the carrier member shaped into channel form, the outside surface of one side wall of the channel so formed is covered by the material in the relatively soft form, the beading runs along this outside surface, the outside surface of the other side wall of the channel is covered by the material in the relatively hard form, and the gripping ribs run along the inside surfaces of the side walls of the channel.

30. A method according to claim 29, including the step of extruding the material in its relatively hard and relatively soft forms so that together they cover the whole of the other surface of the carrier member and join along a line which extends longitudinally of the carrier member along that surface and is parallel to and in alignment with the first-mentioned line.

* * * * *